United States Patent
Aggarwal et al.

(10) Patent No.: US 6,873,977 B1
(45) Date of Patent: Mar. 29, 2005

(54) ACHIEVING BUYER-SELLER ANONYMITY FOR UNSOPHISTICATED USERS UNDER COLLUSION AMONGST INTERMEDIARIES

(75) Inventors: Alok Aggarwal, Chappaqua, NY (US); Pradeep K. Dubey, New Delhi (IN); Charanjit Singh Jutla, Elmsford, NY (US); Vijay Kumar, New Delhi (IN); Marco Martens, Chappaqua, NY (US); Michael Ira Shub, New York, NY (US); Charles P. Tresser, Mamaroneck, NY (US); Chai Wah Wu, Poughquaq, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/569,068

(22) Filed: May 11, 2000

(51) Int. Cl.[7] ............................ G06F 17/60; H04K 1/00; H04L 9/30
(52) U.S. Cl. .............................. 705/64; 705/26; 705/51; 713/156; 380/23; 380/24; 380/25; 380/30; 380/48; 380/49; 380/50
(58) Field of Search .............................. 705/26, 51, 64, 705/1; 380/24

(56) References Cited

U.S. PATENT DOCUMENTS

| 4,405,829 | A | | 9/1983 | Rivest et al. | |
|---|---|---|---|---|---|
| 5,420,926 | A | * | 5/1995 | Low et al. | 380/24 |
| 2001/0037253 | A1 | * | 11/2001 | Kensey | |
| 2002/0059144 | A1 | * | 5/2002 | Meffert et al. | |

OTHER PUBLICATIONS

Benjamin Cox, "Maintaining Privacy In Electronic Transactions", MS Thesis, Information Networking Institute, Carnegie Mellon University, Aug. 1994.*

B. Cox, "Maintaining Privacy in Electronic Transactions", Carnegie Mellon University, Pennsylvania, Aug. 1994.

* cited by examiner

*Primary Examiner*—James P. Trammell
*Assistant Examiner*—Daniel L. Greene
(74) *Attorney, Agent, or Firm*—Whitman, Curtis & Christofferson, P.C.; T. Rao Coca (57) ABSTRACT

A method and system offer confidential purchase of electronic data which can be used without any need of knowledge in cryptography nor mastery of computer use beyond usual usage of the World Wide Web (WWW). The method and system which guarantee confidentiality as long as there is no collusion between agents working for a large number of reputable companies whose references can be easily checked on the Internet before proceeding to the order. In addition, the method and system allow for guaranteed payment and offer recourse in case of improper delivery.

11 Claims, 5 Drawing Sheets

ACHIEVING BUYER-SELLER ANONYMITY FOR UNSOPHISTICATED USERS UNDER COLLUSION AMONGST INTERMEDIARIES

CROSS-REFERENCE TO RELATED APPLICATION

The subject matter of this patent application is related to that of U.S. patent application Ser. No. 09/129,826 filed Aug. 5, 1998, by Michael Shub, Charles P. Tresser and Chai Wah Wu for "Method and Apparatus for Remote Commerce with Customer Anonymity". The disclosure of application Ser. No. 09/129,826 is incorporated herein by reference.

BACKGROUND OF THE INVENTION

1. Field of the Invention

The present invention generally relates to the problem of electronic commercial transactions without disclosure of the customers identity to anyone knowing what is bought and, more particularly, to a system and method which achieve buyer-seller anonymity without any need of knowledge in cryptography nor mastery of computer use by a user beyond usual usage of the World Wide Web (WWW). The present invention provides a method where all services and goods are paid for in a secure way, and inappropriate deliveries, such as contaminated or corrupted files or incorrectly filled orders, may be accounted for and the responsible agent identified in the case that a claim is to be made for losses due to the inappropriate delivery or the customer's need to have the goods replaced.

2. Background Description

In classical retail commerce, the customer could go to a store, pay cash, and carry out what she or he bought while totally preserving her/his anonymity. Electronic commerce now allows home purchase from a variety of merchants, but often at the price of losing anonymity. A huge number of potential customers stay away from remote commerce, now made easy by the World Wide Web (WWW), because they are afraid that once in the system, they would be included in databases that the merchants could exchange for a variety of commercial purposes; otherwise speaking, the so-called "big brother" and invasion of privacy syndromes worry more and more potential electronic business users, thus limiting the expansion of electronic and other forms of remote businesses. It is thus important to have a means to sell goods through the Internet without invading the privacy of the customers and even better preserving their anonymity.

Several solutions to this problem have been proposed. In general to ensure anonymity, one needs some intermediate relay(s) between the customer and the merchant. To protect the system against collusion between agents working for the relays, several relays need to be provided. In order to describe the prior art relevant to this problem, as well as to describe the present invention, we need some concepts and tools from modern cryptography.

More precisely, private key/public key pairs (we also say public encryption schemes), Rabin's IDA (Information Dispersal Algorithm), and secure hash functions (such as the Secure Hash Algorithm (SHA-1)) will be used in this invention. The use of private key/public key pairs, IDA, and of secure hash functions are now well known. A description of these techniques with directions on how to use several of their implementations can be found in *Handbook of Applied Cryptography*, by Alfred J. Menezes, Paul C. van Oorschot and Scott A. Vanstone, CRC Press, 1997, and in *Cryptography, Theory and Practice* by Douglas R. Stinson, CRC Press, 1995. For definitness, each time one uses a private encryption scheme, one can choose the RSA (Rivest, Shamir and Adleman) protocol, described in U.S. Pat. No. 4,405,829 to Rivest et al., as a method to generate and use a secret key/private key (SK/PK) pair in order to allow for public encryption. Several other methods could also be used (see, e.g., the *Handbook of Applied Cryptography*).

A solution to the problem of buyer anonymity was proposed in the U.S. patent application Ser. No. 09/129,826. This invention was concerned with the problem of buying physical goods such as books or electronic equipment over the Internet. Similar problems have received several solutions in the case that what is bought is information, data, and more generally material which can be transferred in electronic form on the Internet, which is also the problem we consider here. One example is given in the paper entitled "NetBill Security and Transaction Protocol" by B. Cox, J. D. Tygar, an M. Sirbu prepared under Advanced Research Projects Agency contract No. FI9628-95-C-0018, "Electronic Commerce: The Netbill Project." See, in particular, the paper "Maintaining privacy in electronic transactions" by Benjamin T. H. Cox (Carnegie Mellon University masters thesis, Pittsburgh, Pa., August 1994). As remarked by Cox in section 5.1.3 "Encrypted Multiple Agent", to really guarantee the customer anonymity, it is important to make sure that no individual forwarding agent knows both participants, so that several collusions are needed among participants to the protocol that one uses.

SUMMARY OF THE INVENTION

It is an object of the present invention to provide an easy to use privacy protection system with essentially the same advantages of the prior system, which facilitates checks on the trustworthiness of the various parties involved, and with some customer protection features such as means to claim for improper deliveries.

The present invention proposes a business model allowing very mildly sophisticated customers to use the benefits of the proposed algorithm for confidentiality protection, at the same time allowing for easy fraud protection to be exerted by the most sophisticated users and/or regulating authorities, and also incorporating mechanisms for claim for improper delivery. Whereas the prior art implements an algorithm for secure anonymous transmission of data for use by computer literate users, the present invention applies to a business model for purchasing electronic goods with customer anonymity which can be used by unsophisticated users which incorporates measures of accountability necessary for business.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

A Re-Formulation of the Prior Art

Figure 1:
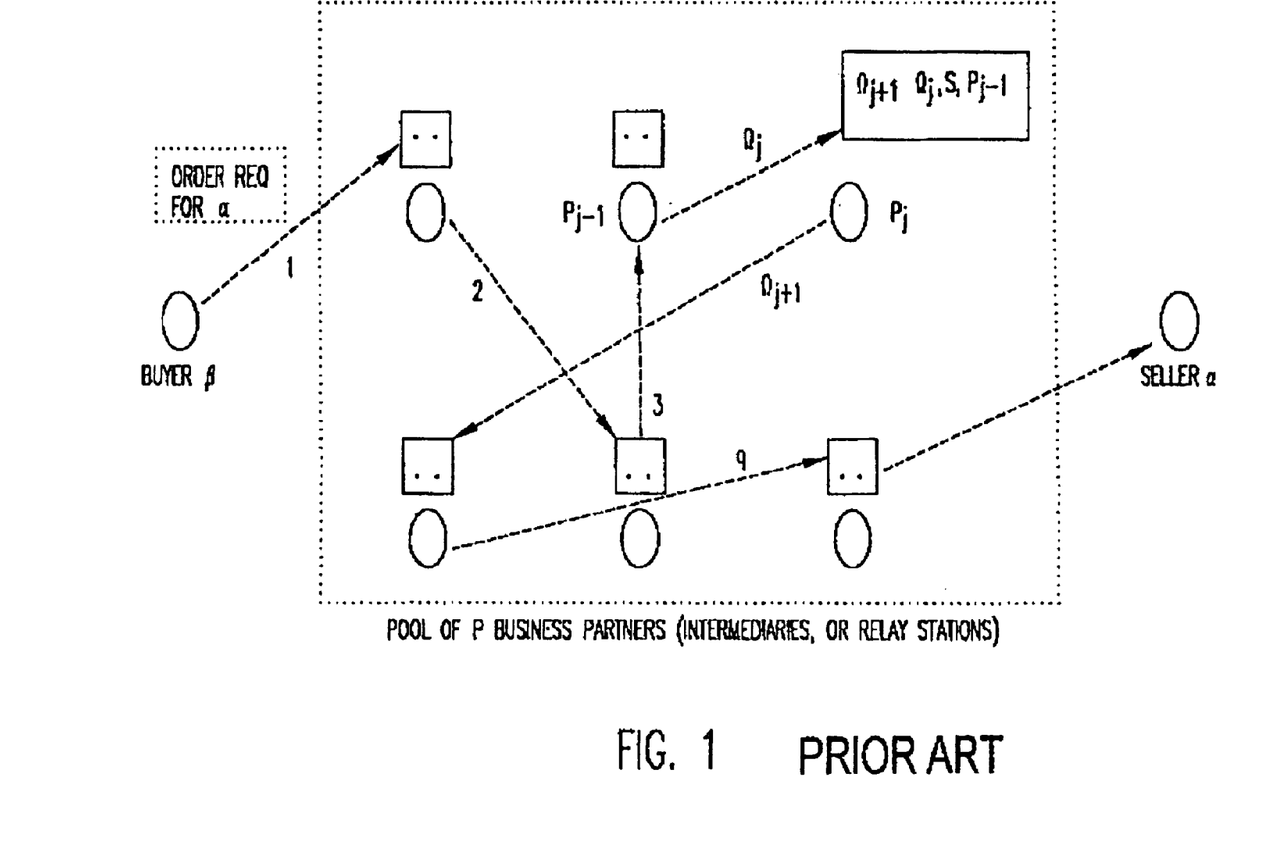
FIG. 1 is a flow diagram describing a prior algorithm.

Referring now to the drawings, and more particularly to FIG. 1, there is shown a model of electronic-commerce (e-commerce) as described in the above mentioned reference to Benjamin T. H. Cox. This model may be characterized as consisting of a buyer, $\beta$, a seller $\alpha$, and a pool of $\rho$ business partners, relay-stations, or intermediaries. One can describe the problem of buyer-seller anonymity in this context as that of no one knowing the buyer-seller correspondence at any point except for the buyer.

The process begins by buyer $\beta$ randomly picking a unique session key S capable of serving as a public key. It also randomly picks a cycle-free path of length q through the pool of $\rho$ business partners, say by repeated coin tosses. The buy order is encrypted with the public key of the seller. The identity of the seller, $a\alpha$, along with S, is appended to the encrypted buy order and encoded with the public key of $\rho_q$. This entire encrypted information in turn is appended with S and the identity of $\rho_q$, and encrypted with the public key of $\rho_{(q-1)}$. This entire encrypted information is again appended with S and the identity of $\rho_{(q-2)}$ and encrypted with the public key of $\rho_{(q-3)}$. This continues until the identity of the second hop in the path, $\rho_2$ is appended and the entire message encrypted with the public key of $\rho_1$. This encrypted buy order is assigned a unique initial order number $\Omega_1$.

Business partner $\rho_j$ receives a message with a unique order number $\Omega_j$ from business partner $\rho_{(j-1)}$. Business partner $\rho_j$ assigns the message another unique order number $\Omega_{(j+1)}$. Using its own private key, business partner, $\rho_j$ decrypts the received message to obtain the session key S, encrypted information about the next hop $\rho_{(j+1)}$, and the message to be forwarded. The message is forwarded to $\rho_{(j+1)}$ along with the new order number, $\Omega_{(j+1)}$. Also, a table entry is made noting the correspondence between $\Omega_{(j+1)}$ and the tuple $(\rho_{(j-1)}, \Omega_j, S)$.

After q hops, the buy order is received by the seller $\alpha$, where it gets fulfilled. Assume the item being bought is deliverable electronically. Under this assumption, the seller signs, then encodes the fulfilled request with associated session key S, and forwards it to the business partner, $\rho_q$, along with the received order number.

When a business partner receives a fulfilled request, it looks up in its table indexed with the received order number to get the tuple $(\rho_{(j-1)}, \Omega_j, S)$. It signs the message, and encrypts it with the session key S, and forwards it to $\rho_{(j-1)}$. The fulfilled request will finally reach the buyer after q hops.

Upon receiving the fulfilled buy order, the buyer repeatedly performs decryption and signature verification. After q+1 repetitions, she recovers the information purchased.

Note that in the algorithm described above, the buyer-seller correspondence is not known at any point during the path to and from the seller, except at the buyer's end. This essential feature also holds true for the present invention. As noted by Cox, to make the protocol even more secure, one can use Rabin's IDA to partition the orders so that transmission are made in parallel. Such improvement can also be made by anybody versed in the art on the invention to be disclosed, which builds on the above algorithm to offer a method of doing business usable by a large class of potential customers.

The line of thought leading to the solution we present here goes back at least to the paper "The Dining Cryptographers Problem: Unconditional Sender and Recipient Untraceability", *J. Cryptology* (1988) 1:65–75, by David Chaum.

Problems to be Solved

Besides solving the customer anonymity problem, we need to define a protocol where all services and goods are paid for in a secure way and inappropriate deliveries can be avoided as much as possible, and claimed for if not avoided. The invention we present here solves all these problems.

More importantly, the above mentioned system, in order to allow for high anonymity protection, requires the customer to locate a multitude of agents, requires the use by the customer of complex iterated encoding procedures in a non-necessarily automated way (as all agents have to be localized), and obliges the merchants to administrate cryptographic capabilities and post cryptographic keys. Certainly, a small minority of very sophisticated computer users can join force to provide this service to their own very special group, but such privacy capabilities should be accessible to a much larger set of potential users which do not necessarily desire to handle a complicated procedure. Also, the distributed responsibilities in the above system is a source of lack of security as it would be difficult to check all agents used as relays.

Solution Provided by the Invention

The description of the invention will involve two parts. In the first part, we will describe how a company gets prepared to offer the confidentiality protection services and other benefits we claim. In the second part, we will describe how the service will be used by a customer.

Before we proceed, we need to formulate the following generalization of the prior algorithm, which is necessary to integrate the desired level of security into a sustainable business model accessible by a large class of customers.

Generalization of Prior Algorithm

Figure 2:
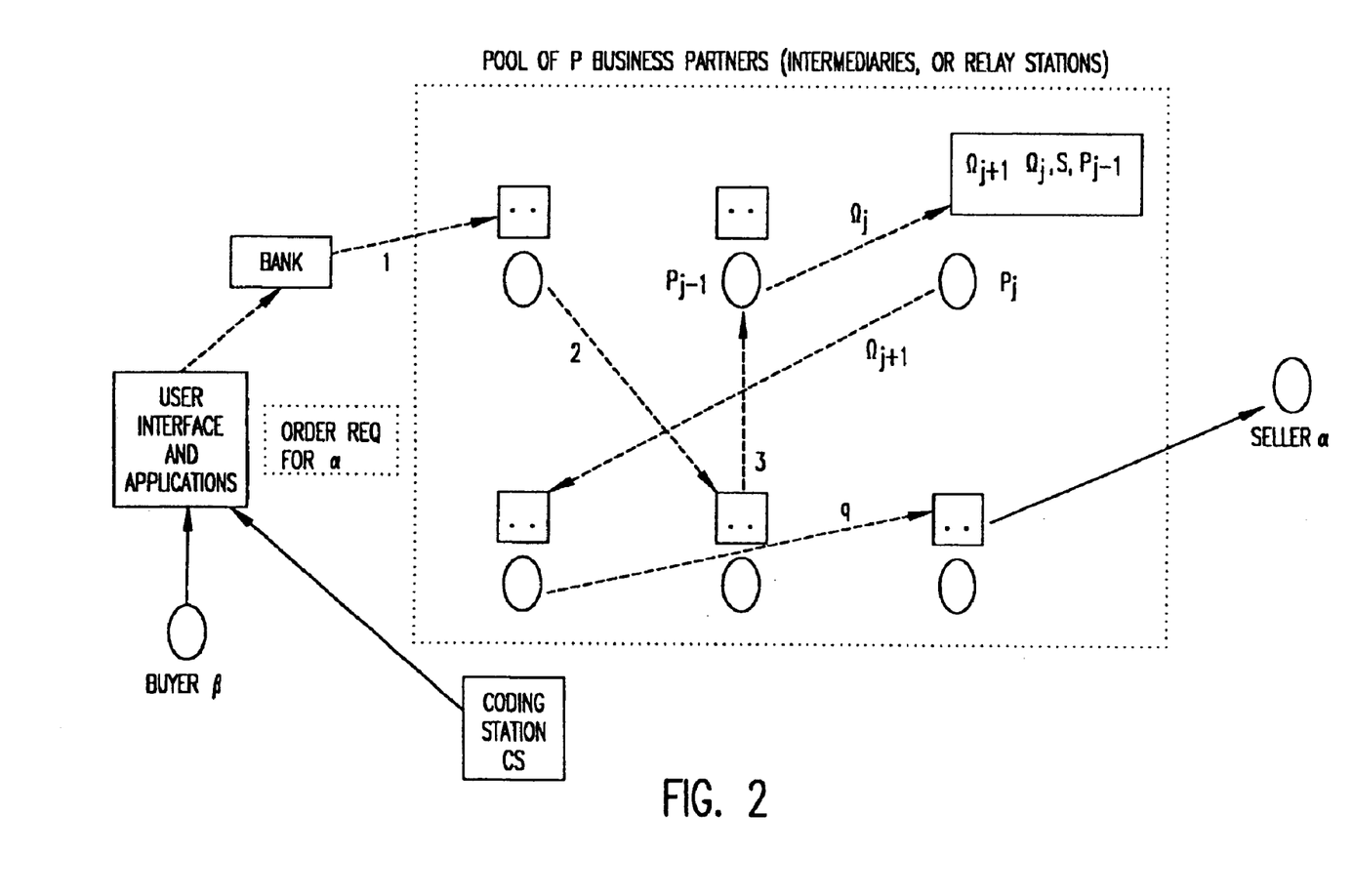
FIG. 2 is a flow diagram describing a generalization of the prior algorithm, in a form needed for implementation in the present invention.

Referring now to FIG. 2, buyer $\beta$ randomly picks unique session keys $S_1, S_2, \ldots, S_{(q+1)}$ capable of serving as a public key. Buyer $\beta$ also randomly picks a cycle-free path of length q through the pool of $\rho$ business partners, say by repeated coin tosses. The buy order is encrypted with the public key of the seller. The identity of the seller, $a\alpha$, along with $S_q$, is appended to the encrypted buy order and encoded with the public key of $\rho_q$. This entire encrypted information in turn is appended with $S_{(q-1)}$ and the identity of $\rho_q$, and encrypted with the public key of $\rho_{(q-1)}$. This entire encrypted information is again appended with $S_{(q-2)}$ and the identity of $\rho_{(q-2)}$, and encrypted with the public key of $\rho_{(q-3)}$. This continues until the identity of the second hop in the path, $\rho_2$ is appended and the entire message encrypted with the public key of $\rho_1$. This encrypted buy order is assigned a unique initial order number $\Omega_1$.

Business partner $\rho_j$ receives a message with a unique order number $\Omega_j$ from business partner $\rho_{(j-1)}$. It assigns it another unique order number $\Omega_{(j+1)}$. Using its own private key, business partner, $\rho_j$ decrypts the received message to obtain the session key S, encrypted information about the next hop $\rho_{(j+1)}$, and the message to be forwarded. The message is forwarded to $\rho_{(j+1)}$ along with the new order number, $\Omega_{(j+1)}$. Also, a table entry is made noting the correspondence between: $\Omega_{(j+1)}$ and the tuple $(\rho_{(j-j)}, \Omega_j, S_j)$.

The communication between two business partners should be verified to ensure that it occurred without errors. This can be done with known algorithms.

After q hops, the buy order is received by the seller $\alpha$, where it gets fulfilled. Assume, the item being bought can be delivered electronically. Under this assumption, the seller signs, then encodes the fulfilled request with associated session key $S_{(q+1)}$, and forwards it to the business partner, $\rho_q$, along with the received order number.

When a business partner receives a fulfilled request, it performs a look up of its table indexed with the received order number to get the tuple $(\rho_{(j-1)}, \Omega_j, S_j)$. It signs the message, and encrypts it with the session key $S_j$, and forwards it to $\rho_{(j-1)}$. The fulfilled request will finally reach the buyer after q hops. A variation on this algorithm would have the buyer select a return path different from the $\rho_j$s so that the seller can use the second path for fulfilling the request. Of course, in this case, this path has to be encoded in the order request.

Upon receiving the fulfilled buy order, the buyer repeatedly performs decryption and signature verification. After q+1 repetitions, she recovers the information purchased.

As for the first part, a company CS will play the role of the Coding Station. The CS is a trusted party which provides the software and applications to the users but does not know which of the relays, banks and path $\rho_j$ are chosen by the user. A possible implementation would have the CS send Java code to the customer which is then executed on the customer's computer. This company CS will provide all parties to be involved with some encryption capabilities. The company makes available to the customer all the cryptographic software he or she needs for any transaction. Before anything else happens, CS creates a network of relay stations $RS_1, RS_2, \ldots, RS_N$ belonging to companies $Co_1, Co_2, \ldots, Co_N$ whose description address, etc., will be posted on the home page of CS. CS also arranges alliances with one or several Banks $Bank_1, Bank_2, \ldots, Bank_M$ which will be the customers' entrance to the transaction processes, and with vendors $Vend_1, Vend_2$, a list expected to grow. Some of the vendors can be contacted after a request arrives from a customer (CS can give incentives, such as prizes, to customers who help enlist new vendors). All relay-stations, banks, and vendors may accept contracts with several Coding Stations. As all information is published in well publicized places such as Web sites and home pages, any customer will benefit from the fact that expert customers will make sure there is no break in the security of the network, and from the fact that the authorities can insure that all players are respectable companies.

When customer $Cust_1$ wants to order something from vendor $Vend_j$, he or she goes to the home page HP of some CS. There he or she chooses, possibly with a random tool offered on HP, a list of K relays $Co_{i1}, Co_{i2}, \ldots, Co_{iK}$ out of the N possibilities offered by HP. He or she also get all tools and information so that, by simple operations which do not necessitate any sophistication in software or cryptography, he or she can compose an order, choose a bank among $Bank_1, Bank_2, \ldots$, and send the order to that bank. The customer chooses the relays in such a way that CS does not know which relays, banks and vendor are chosen. For instance, the entire database can be downloaded to the customer's computer and the relays, banks and vendor are selected locally. Furthermore, all the cryotographic encryption and decryption are also done locally at the customer's computer via the software downloaded from CS. The order will then be forwarded through the path $Co_{i1}, Co_{i2}, \ldots, Co_{iK}$ so that:

- payment will be guaranteed if the order is delivered, as non-repudiable certificates will be exchanged at all transaction on the chain from the bank to the vendor and back,
- no one can both a) have knowledge of the order or even the vendor and b) have any access to customer identity or location, because the full power of the prior art algorithm described above will be used,
- the customer can make a claim for invalid deliveries, because the bank and/or CS can serve as authorities in resolving disputes and can determine with the help of the buyer where the delivery failed, and
- improper deliveries due to improper transmissions will be avoided by using signatures; traceability by eavesdroppers on the network will be prevented by grouping orders, packaging in equal length messages after cutting long orders if necessary, and maintaining enough traffic of blank orders when regular orders are not sufficient to confuse eavesdroppers.

Figure 3:
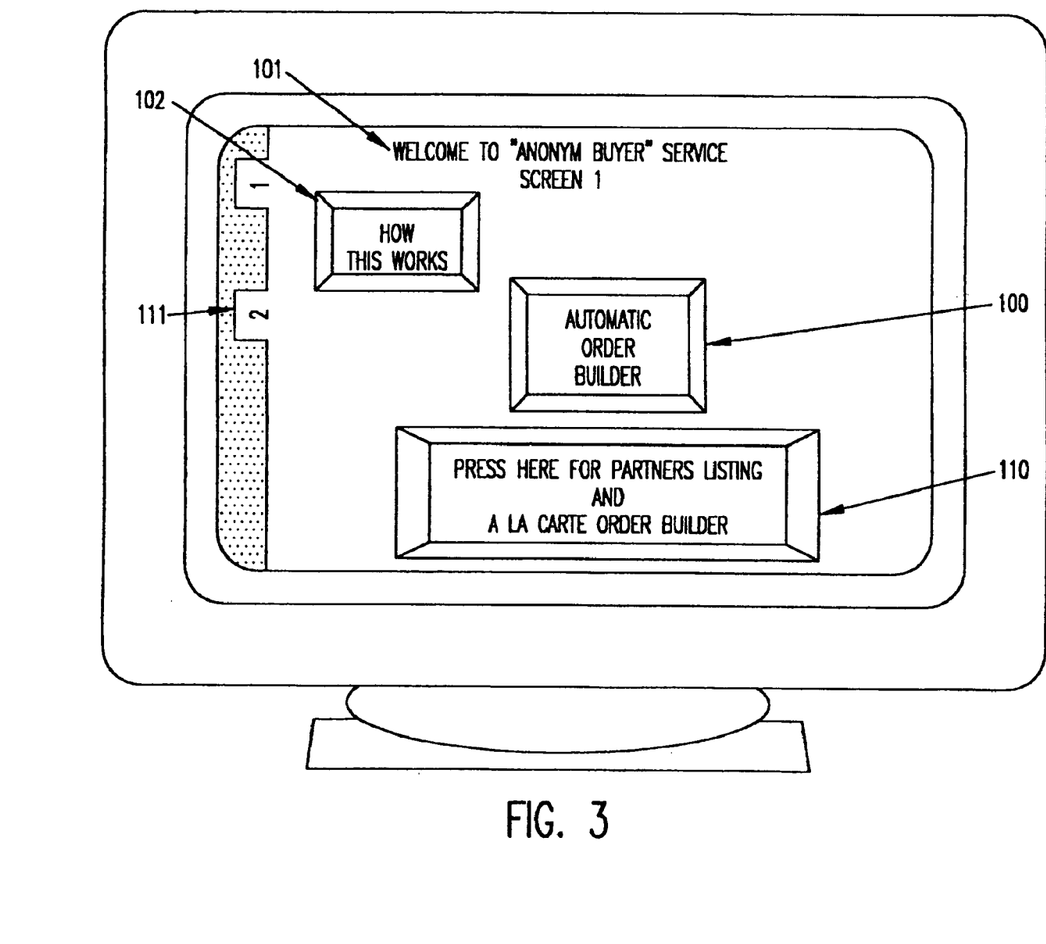
FIG. 3 is a pictorial diagram representing a screen offered to the customer entering the site of a coding station according to the invention.
Figure 4:
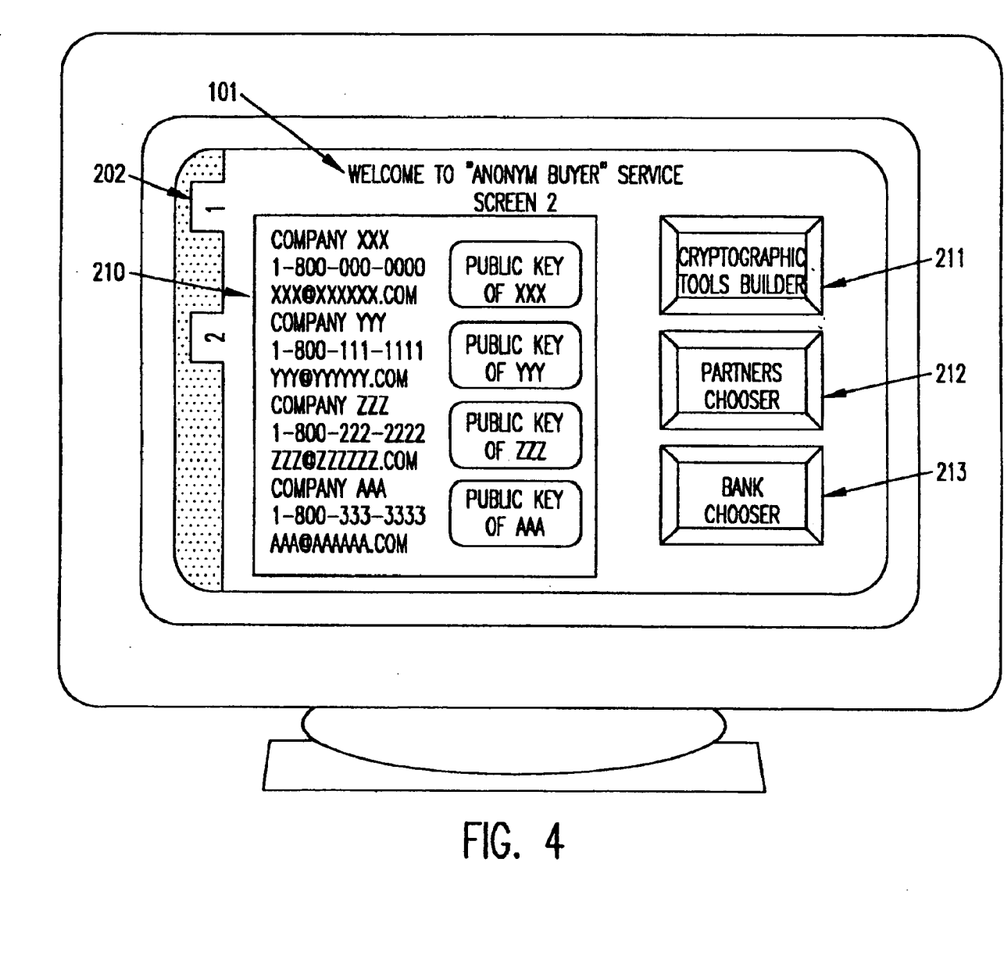
FIG. 4 is a pictorial diagram representing a second screen offered to the customer entering the site of a coding station according to the invention.

In FIG. 3, there is shown a schematic form of the top (Screen 1) of the home page HP of CS presented with a banner at 101 and a button opening explanations at 102. The user can click button 100 to completely automate the processing of the transaction, or at 110 or 102 a button which will launch a page (Screen 2 represented in FIG. 4) where the user can find instructions to proceed with more or less automation (for instance with a list of partners at 210 with relevant data about them, buttons to make several choices at 211, 212, 213, and a return to Screen 1 at 202). The steps to follow then will parallel what needs to be done by the automatic process which we next describe in detail.

Upon clicking button 100, an application $Aplic_1$ is transferred to the customer's computer from CS and an icon for $Aplic_1$ appears on the desktop. This icon can be used for further orders. Also upon clicking on 100, a page $Page_1$ is opened. $Aplic_1$ will simultaneously prepare some data and offer a $Page_1$ represented schematically in FIG. 5, where the customer $Cust_1$ can input the information needed to perform the order. In a first window at 300, $Cust_1$ can choose one of the vendors offered or choose the option "OTHER" at 301, in which case a separate input window appears at 302, inviting the customer to write the name and further identification(s) of the vendor (telephone number, e-mail address, etc.). If this information is insufficient, notice will be given to $Cust_i$. In a second window 310, which appears after one of the offered vendors is selected, $Cust_i$ can choose one of the offered items, which appears with its prize, or choose "OTHER", in which case again a window appears inviting the customer to designate an item and its item prize.

Figure 5:
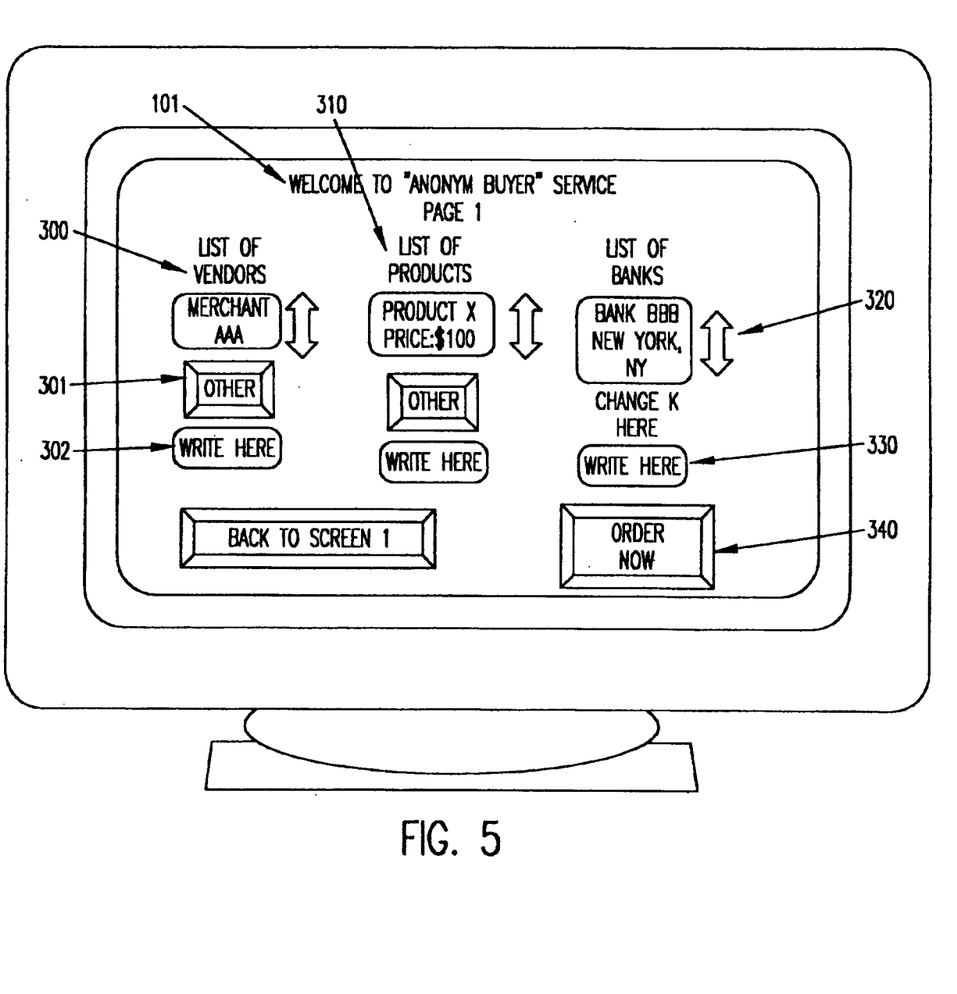
FIG. 5 is a pictorial diagram representing the page launched upon choosing the automated use of the offering.

Once these elements are selected, $Cust_i$ goes to window 320 to select a Bank among the list Banks $Bank_1, Bank_2, \ldots, Bank_M$ which have an agreement with the selected coding station CS. $Cust_i$ is then told that some predetermined number K0 of relays will be involved in the transaction, corresponding to some prize which depends on K0 and possibly on the order value, and that the prize and security level can be changed by selecting at 330 another value K not greater than N. $Cust_i$ can either proceed with K0 or change K. After that, an "ORDER NOW" button is offered at 340 with usual disclaimers depending on legislation. After the "ORDER NOW" button is activated, the order is sent to the selected bank.

In the case $Cust_i$ has an agreement with that bank, no further action is required. Otherwise, the bank sends an on-line registration form to $Cust_i$, which must be completed before the order is processed. Once the form is completed, the window disappears and an application $Aplic_2$ is created using data collected by $Aplic_1$. After reception of the order, $Cust_i$ will drag and drop the received order, or push a button in the message containing the ordered item to have $Aplic_2$ transform the encrypted order into the form proper for use. While the customer deals with ordering, $Aplic_1$ performs the following tasks:

- select an ordered set $Co_{i1}, Co_{i2}, \ldots, Co_{iK}$ of relays, and the associated public keys $Pub(Co_{i1}), Pub(Co_{i2}), \ldots, Pub(Co_{iK})$, as well as a public key $Pub(CS)$,
- create a list of K Public Key/Private key pairs ($\{Pub_1, Priv_1\}, \{Pub_2, Priv_2\}, \ldots, \{Pub_K, Priv_K\}$) and one more $\{Pub_{SB}, Priv_{SB}\}$ for the Seller-Buyer (SB), and
- use the order created by $Cust_i$ to create the message that will be sent to the bank.

This will be done using the previous algorithm described above, and so that each relay receives the public key it will use when sending back the order to $Cust_i$. All keys will be kept as parts of $Aplic_2$ to be used after reception of the order.

In case of a dispute, the buyer can send messages to the seller and the seller can send a response to the buyer using the same algorithm. In addition, as a further mechanism for dealing with disputes, the buyer can send to the CS the names of the relays, the banks and the associated public keys used so that the CS can verify at which stage the transaction has gone wrong. This requires that the relays keep records of their activities.

Since each agent signs the fulfilled buy order, the buyer (or the CS when given the appropriate data by the buyer) can detect when the file has been corrupted. The algorithm implemented by this invention can add additional components so that the business partners retain a transmitted order temporarily and retain records of transactions such that the customer can verify proper deliveries, if needed. By querying the agent for the order that they receive and that they transmit, the buyer (or the CS) can also verify where the transmission got corrupted.

It should be noted that the algorithm implemented by this invention can also be used for transactions involving physical goods in which each of the relays acts as a clearinghouse with non-colluding carriers transporting the goods between the relays. This is a generalization of the disclosure in application Ser. No. 09/129,826 where one clearinghouse and two carriers are used.

While the invention has been described in terms of a single preferred embodiment, those skilled in the art will recognize that the invention can be practiced with modification within the spirit and scope of the appended claims.

What is claimed is:

1. A method for achieving seller-buyer (SB) anonymity for unsophisticated users, comprising the steps of:

providing to a buyer an interface for random selection of a plurality q+1 of unique session keys and a cycle-free path of length q through a pool of business partners;

using said unique session keys as public keys to encrypt an order of said buyer from a seller, first encrypting said order with a public key of said seller, then appending to said encrypted buy order an identity of said seller together with said qth session key and encrypting said appended buy order with the public key of the qth business partner, then appending to said encrypted appended buy order an identity of said qth business partner together with said (q−1)th session key and further encrypting said appended buy order with the public key of the (q−1)th business partner, continuing in like fashion until said encrypted appended buy order is further appended with the identity of the $2^{nd}$ business partner together with the $1^{st}$ session key and said further appended buy order is finally encrypted with the public key of the $1^{st}$ business partner, said finally encrypted buy order being given a unique $1^{st}$ order number transmitting said finally encrypted buy order to said seller via said business partners through said cycle-free path, each said business partner decrypting said encrypted buy order with said business partner's private key to obtain said appended session key and said identity of a next business partner in said path together with a next level encrypted buy order and then assigning a further unique order number and forwarding the next level encrypted buy order to said next business partner along with said further unique order number;

returning from said seller to said buyer a fulfillment of said buy order via said business partners through said cycle-free path, each said business partner encoding its signature and said fulfillment with said appended session key prior to forwarding;

designating a Coding Station (CS) that will provide all parties with encryption capabilities;

creating by CS a network of relay stations $RS_1, RS_2, \ldots, RS_N$ belonging to companies $Co_1, Co_2, \ldots, Co_N$ whose description will be posted on a home page HP of CS;

arranging by CS alliances with one or several Banks $Bank_1, Bank_2, \ldots, Bank_M$ which will be customers' entrance to transaction processes and with a plurality of vendors $Vend_1, Vend_2, \ldots$;

publishing by CS all information on relay-stations, banks, and vendors in the home page;

placing an order by a customer from one of said plurality of vendors by going to the home page HP of CS and choosing a list of K relays $Co_{i1}, Co_{i2}, \ldots, Co_{iK}$ out of the N possibilities offered by HP, selecting a bank among $Bank_1, Bank_2, \ldots$, and sending the order to that bank, said order placement being done through an automated user interface; and forwarding the order through the path $Co_{i1}, Co_{i2}, \ldots, Co_{iK}$ so that payment will be guaranteed if the order is delivered.

2. The method for achieving seller-buyer (SB) anonymity for unsophisticated users recited in claim 1, wherein said automated user interface is accessible from the home page HP of CS with a first button selectable by the user to initiate automatic processing of the transaction.

3. The method for achieving seller-buyer (SB) anonymity for unsophisticated users recited in claim 2, wherein said automated user interface provides the user at the home page HP of CS with a second button which, when selected by the user, will launch a page where the user can find instructions to complete a transaction with a seller with anonymity.

4. The method for achieving seller-buyer (SB) anonymity for unsophisticated users recited in claim 2, further comprising the steps of:

upon selecting the first button by the user, transferring a first application to the customer's computer;

opening a page where the customer can input the information needed to complete the order; and simultaneously performing by the first application the steps of selecting an ordered set $Co_{i1}, Co_{i2}, \ldots, Co_{iK}$ of relays, and the associated public keys $Pub(Co_{i1}), Pub(Co_{i2}), \ldots, Pub(Co_{iK})$, as well as a public key $Pub(CS)$, creating a list of K Public Key/Private key pairs ($\{Pub_1, Priv_1\}, \{Pub_2, Priv_2\}, \ldots, \{Pub_K, Priv_K\}$) and one more $\{Pub_{SB}, Priv_{SB}\}$ for Seller-Buyer SB, and using the order created by the customer to create a message to be sent to the selected bank.

5. The method for achieving seller-buyer (SB) anonymity for unsophisticated users recited in claim 4, further comprising the steps of:

displaying a first window in the page where the customer can select a vendor; and upon selecting a vendor by the customer, displaying a second window in which the customer can choose an item from among items offered by the selected vendor.

6. The method for achieving seller-buyer (SB) anonymity for unsophisticated users recited in claim 5, further comprising the steps of:

displaying a third window in which the customer can select a Bank among the list Banks $Bank_1$, $Bank_2, \ldots, Bank_M$ which have an agreement with the coding station CS; and displaying an "ORDER NOW" button which, when activated, causes the order to be sent to the selected bank.

7. The method for achieving seller-buyer (SB) anonymity for unsophisticated users recited in claim 6, further comprising the steps of:

once the order is sent, creating a second application using data collected by the first application;

transforming by the second application an encrypted order into a form proper for use in said transmitting and returning steps.

8. A system for achieving buyer-seller anonymity for unsophisticated users, comprising:

means for providing to a buyer an interface for random selection of a plurality q+1 of unique session keys and a cycle-free path of length q through a pool of business partners;

means for using said unique session keys as public keys to encrypt an order of said buyer from a seller, first encrypting said order with a public key of said seller, then appending to said encrypted buy order an identity of said seller together with said qth session key and encrypting said appended buy order with the public key of the qth business partner, then appending to said encrypted appended buy order an identity of said qth business partner together with said (q−1)th session key and further encrypting said appended buy order with the public key of the (q−1)th business partner, continuing in like fashion until said encrypted appended buy order is further appended with the identity of the $2^{nd}$ business partner together with the $1^{st}$ session key and said further appended buy order is finally encrypted with the public key of the $1^{st}$ business partner, said finally encrypted buy order being given a unique $1^{st}$ order number means for transmitting said finally encrypted buy order to said seller via said business partners through said cycle-free path, each said business partner decrypting said encrypted buy order with said business partner's private key to obtain said appended session key and said identity of a next business partner in said path together with a next level encrypted buy order and then assigning a further unique order number and forwarding the next level encrypted buy order to said next business partner along with said further unique order number;

means for returning from said seller to said buyer a fulfillment of said buy order via said business partners through said cycle-free path, each said business partner encoding its signature and said fulfillment with said appended session key prior to forwarding;

display means presenting a home page HP of a Coding Station CS with a first button selectable by a user to initiate automatic processing of a transaction, CS having created a network of relay stations $RS_1, RS_2, \ldots, RS_N$ belonging to companies $Co_1, Co_2, \ldots, Co_N$ whose description is posted on a home page HP of CS, CS also having arranged alliances with one or several Banks $Bank_1, Bank_2, \ldots, Bank_M$ to serve as customers' entrance to transaction processes with a plurality of vendors $Vend_1, Vend_2, \ldots$, CS also having published all information on relay-stations, banks, and vendors in the home page; and means responding to selection of the first button by the user, thereby transferring a first application to the customer's computer, said display means opening a page where the customer can input the information needed to complete the order, and said first application simultaneously performing the steps of selecting an ordered set $Co_{i1}, Co_{i2}, \ldots, Co_{iK}$ of relays, and the associated public keys $Pub(Co_{i1}), Pub(Co_{i2}), \ldots, Pub(Co_{iK})$, as well as a public key Pub(CS), creating a list of K Public Key/Private key pairs ($\{Pub_1, Priv_1\}, \{Pub_2, Priv_2\}, \ldots, \{Pub_K, Priv_K\}$) and one more $\{Pub_{SB}, Priv_{SB}\}$ for Seller-Buyer SB, and using the order created by the customer to create a message to be sent to a bank selected by the user.

9. The system recited in claim 8, wherein said display means displays a first window in the page where the customer can select a vendor, and upon selecting a vendor by the customer, displays a second window in which the customer can choose an item from among items offered by the selected vendor.

10. The system recited in claim 9, wherein said display means further displays a third window in which the customer can select a Bank among the list Banks $Bank_1$, $Bank_2, \ldots, Bank_M$ which have an agreement with the coding station CS, and displays an "ORDER NOW" button which, when activated, causes the order to be sent to the selected bank.

11. The system recited in claim 10, further comprising means for creating a second application using data collected by the first application, wherein once the order is sent, said second application transforms an encrypted order into a form proper for use with said transmitting and returning means.

* * * * *

Disclaimer

6,873,977 — Alok Aggarwal, Chappaqua, NY (US); Pradeep K. Dubey, New Delhi (IN); Charanjit Singh Jutla, Elmsford, NY (US); Vijay Kumar, New Delhi (IN); Marco Martens, Chappaqua, NY (US); Michael Ira Shub, New York, NY (US); Charles P. Tresser, Mamaroneck, NY (US); and Chai Wah Wu, Poughquag, NY (US). ACHIEVING BUYER-SELLER ANONYMITY FOR UNSOPHISTICATED USERS UNDER COLLUSION AMONGST INTERMEDIARIES. Patent dated March 29, 2005. Disclaimer filed October 5, 2006, by the assignee, International Business Machines Corporation.

Hereby enter this disclaimer to all claims, of said patent.

*(Official Gazette, May 27, 2008)*